(12) United States Patent
Osann, Jr.

(10) Patent No.: US 9,122,760 B2
(45) Date of Patent: *Sep. 1, 2015

(54) USER PREFERENCE CORRELATION FOR WEB-BASED SELECTION

(71) Applicant: Robert Osann, Jr., Port Angeles, WA (US)

(72) Inventor: Robert Osann, Jr., Port Angeles, WA (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/829,303

(22) Filed: Mar. 14, 2013

(65) Prior Publication Data

US 2013/0246389 A1  Sep. 19, 2013

Related U.S. Application Data

(63) Continuation-in-part of application No. 12/903,062, filed on Oct. 12, 2010, now Pat. No. 8,429,160.

(51) Int. Cl.
*G06F 17/30* (2006.01)

(52) U.S. Cl.
CPC ...... *G06F 17/30867* (2013.01); *G06F 17/3089* (2013.01); *G06F 17/30864* (2013.01)

(58) Field of Classification Search
CPC ............... G06F 17/30699; G06F 17/30702
See application file for complete search history.

(56) References Cited

U.S. PATENT DOCUMENTS

| 6,012,051 | A | 1/2000 | Sammon, Jr. et al. |
| 7,305,436 | B2 | 12/2007 | Willis |
| 7,370,276 | B2 | 5/2008 | Willis |
| 7,487,151 | B2 | 2/2009 | Yamamoto |
| 7,594,245 | B2 | 9/2009 | Sezan et al. |
| 7,631,263 | B2 | 12/2009 | Morris |
| 7,657,907 | B2 | 2/2010 | Fennan et al. |
| 2006/0026048 | A1 | 2/2006 | Kolawa et al. |
| 2006/0143158 | A1* | 6/2006 | Ruhl et al. ........................ 707/3 |
| 2009/0063247 | A1* | 3/2009 | Burgess et al. ................. 705/10 |
| 2009/0234712 | A1 | 9/2009 | Kolawa et al. |
| 2009/0254541 | A1 | 10/2009 | Kolawa et al. |
| 2010/0023399 | A1* | 1/2010 | Sahni et al. ................. 705/14.53 |
| 2011/0173191 | A1* | 7/2011 | Tsaparas et al. ............. 707/723 |
| 2012/0059848 | A1* | 3/2012 | Krishnamoorthy ........... 707/770 |
| 2012/0254060 | A1* | 10/2012 | Choudhary et al. .......... 705/347 |

* cited by examiner

*Primary Examiner* — Khanh Pham

(57) ABSTRACT

A database of user preference information is extracted and compiled from multiple websites by web-crawling robots without cooperation or specific participation by users. Users who interact with a website are frequently required to register and create a login or userID name that uniquely identifies them. Thereafter, when an individual rates an item, it is often recorded and published under their userID name such that other users can see how a specific individual rated the item. Although there is no requirement that a specific user register on different websites utilizing the identical userID, it is extremely common that this practice occurs and the use of identical userIDs on multiple sites is used herein to expand preference analysis beyond a single site. Once the database exists, users can request or be passively offered suggestions that result from preference associations across multiple websites as performed by a preference analysis and suggestion function.

25 Claims, 14 Drawing Sheets

600

Positive Weighting 0.75 (602)
Negative Weighting 0.25 (604)

| Item | Avg Pos | Weighted Avg Pos | Avg Neg | Weighted Avg Neg | Net Preference Score | Weighted Rank |
|---|---|---|---|---|---|---|
| 1 | 4.42 | 3.32 | -1.1 | -0.28 | 3.04 | 2 |
| 2 | 4.35 | 3.26 | -1.18 | -0.30 | 2.97 | 3 |
| 3 | 4.33 | 3.25 | 1.1 | 0.28 | 3.52 | 1 |
| 4 | 4.25 | 3.19 | -1.5 | -0.38 | 2.81 | 5 |
| 5 | 4.195 | 3.15 | -1.32 | -0.33 | 2.82 | 4 |
| 6 | 4.14 | 3.11 | -2.15 | -0.54 | 2.57 | 8 |
| 7 | 4.085 | 3.06 | -1.2 | -0.30 | 2.76 | 6 |
| 8 | 4.03 | 3.02 | -2.3 | -0.58 | 2.45 | 9 |
| 9 | 3.975 | 2.98 | -1.6 | -0.40 | 2.58 | 7 |

2.84  <Average Net Pref Score 606  608  610  612  614  618  616  620

| | | Positive Weighting 0.9 | | Negative Weighting 0.1 | | |
|---|---|---|---|---|---|---|
| Item | Avg Pos | Weighted Avg Pos | Avg Neg | Weighted Avg Neg | Net Preference Score | Weighted Rank |
| 1 | 4.42 | 3.98 | -1.1 | -0.11 | 3.87 | 2 |
| 2 | 4.35 | 3.92 | -1.18 | -0.12 | 3.80 | 3 |
| 3 | 4.33 | 3.90 | 1.1 | 0.11 | 4.01 | 1 |
| 4 | 4.25 | 3.83 | -1.5 | -0.15 | 3.68 | 4 |
| 5 | 4.195 | 3.78 | -1.32 | -0.13 | 3.64 | 5 |
| 6 | 4.14 | 3.73 | -2.15 | -0.22 | 3.51 | 7 |
| 7 | 4.085 | 3.68 | -1.2 | -0.12 | 3.56 | 6 |
| 8 | 4.03 | 3.63 | -2.3 | -0.23 | 3.40 | 9 |
| 9 | 3.975 | 3.58 | -1.6 | -0.16 | 3.42 | 8 |

3.65 <Average Net Pref Score

| | | Positive Weighting 0.1 | | Negative Weighting 0.9 | | |
|---|---|---|---|---|---|---|
| Item | Avg Pos | Weighted Avg Pos | Avg Neg | Weighted Avg Neg | Net Preference Score | Weighted Rank |
| 1 | 4.42 | 0.44 | -1.1 | -0.11 | 0.33 | 2 |
| 2 | 4.35 | 0.44 | -1.18 | -0.12 | 0.32 | 3 |
| 3 | 4.33 | 0.43 | 1.1 | 0.11 | 0.54 | 1 |
| 4 | 4.25 | 0.43 | -1.5 | -0.15 | 0.28 | 6 |
| 5 | 4.195 | 0.42 | -1.32 | -0.13 | 0.29 | 4 |
| 6 | 4.14 | 0.41 | -2.15 | -0.22 | 0.20 | 8 |
| 7 | 4.085 | 0.41 | -1.2 | -0.12 | 0.29 | 4 |
| 8 | 4.03 | 0.40 | -2.3 | -0.23 | 0.17 | 9 |
| 9 | 3.975 | 0.40 | -1.6 | -0.16 | 0.24 | 7 |

0.29 <Average Net Pref Score

Figure 9

USER PREFERENCE CORRELATION FOR WEB-BASED SELECTION

CROSS REFERENCE AND CLAIM OF PRIORITY

This application is a Continuation-In-Part of U.S. Utility patent application Ser. No. 12/903,062 filed on Oct. 12, 2010, entitled "User Preference Correlation for Web-Based Selection" by inventor Robert Osann, Jr., commonly assigned with the present invention and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the selection of items from a set of items or services (in general, hereinafter referred to collectively as "items") offered or referenced on the Web or Internet in light of user preferences, including sharing and social networking online functionalities, and in particular methods for determining and utilizing user preferences that are not explicitly shared. Items may include media such as videos and photos, but may also include tangible goods such as books, garments, household items, or even services such as restaurants, moving companies, dentists, plumbers, or retail stores, to name a few.

BACKGROUND OF THE INVENTION

Learning what's available on the web that matches one's preferences is generally considered to be useful. Sharing favorites or preferences with people is useful. Since what constitutes a favorite is very personal, recommendations from someone whose favorites more closely match your favorites is especially useful. Many times a friend tells you about some great movie, you often find you don't like it. Just because they are a friend, doesn't mean they like the same things you do. However, there are people out there who do have preferences very similar to yours. You just don't know who they are.

A single website that keeps track of user preferences (like amazon.com or youtube.com) has a database on which to draw in order to offer the capability for "people who liked this also liked . . ." or the even more focused, "people who in general like what you like, also like . . .". Amazon chooses to offer such a functionality while at the time of this writing, Youtube does not. Regardless, when a particular website offers this preference matching functionality, it ONLY does it within that website. Some websites like yelp.com do not offer items for sale or download, but focus specifically on reviews for products and/or services. At present, user/visitor preferences for websites are useful in determining preference associations among users, however again, the ability to match preferences and suggest other items that the visitor might like is only available for items on that particular website and does not span multiple websites.

Determining suggestions based on an analysis of user preferences is based on a process generally known in the art as Collaborative Filtering (CF). According to Wikipedia.com, "this is the process of filtering for information or patterns using techniques involving collaboration among multiple agents, viewpoints, data sources, etc. Applications of collaborative filtering typically involve very large data sets. Collaborative filtering methods have been applied to many different kinds of data including sensing and monitoring data—such as in mineral exploration, environmental sensing over large areas or multiple sensors; financial data—such as financial service institutions that integrate many financial sources; or in electronic commerce and web 2.0 applications where the focus is on user data, etc." "The method of making automatic predictions (filtering) about the interests of a user by collecting taste information from many users (collaborating). The underlying assumption of CF approach is that those who agreed in the past tend to agree again in the future. For example, a collaborative filtering or recommendation system for television tastes could make predictions about which television show a user should like given a partial list of that user's tastes (likes or dislikes). Note that these predictions are specific to the user, but use information gleaned from many users."

Today, the ability to match preferences and suggest other items that the visitor might like does not span multiple websites. Thus, it would be novel and advantageous to offer a preference matching and suggestion capability that spans the breadth of the Internet—covering all sites offering a specific type of item (videos, books, services, restaurants, etc.) or alternately covering multiple item categories. With such a capability, users would benefit from a higher degree of correlation and thus would make more informed decisions on products and services they buy.

SUMMARY OF THE INVENTION

In order to build a site where people voluntarily participate in and contribute to a "universal preferences database" based on preference information that is explicitly supplied by each user, there is a substantial obstacle of how a critical mass of information is initially compiled. Essentially this is a "chicken-or-the-egg" problem regarding how to jump-start the entire methodology so that enough people participate to make it work. The major barrier to jump-starting is getting people to sign up. Why should someone take the time to sign up and enter their favorites/preferences when there is not enough information assembled to provide them any useful information in return? The solution lies in using their unique "login" or "userID" name to acquire preference information and build a database of user preference information without requiring participation by users. Once this information has been gathered by web robots, users can request (or be passively offered) suggestions that result from preference associations across multiple websites as performed by a preference analysis and suggestion software functionality that may for some embodiments be implemented as a software program working in conjunction with associated databases.

BRIEF DESCRIPTION OF THE DRAWINGS

FIG. 6 shows a table demonstrating will how positive preference ratings may be weighted more relative to negative ratings in order to produce a net preference score.

FIG. 8 shows a table demonstrating will how positive preference ratings may be weighted highly relative to negative ratings in order to produce a net preference score.

FIG. 9 shows a table demonstrating will how negative preference ratings may be weighted highly relative to positive ratings in order to produce a net preference score.

DETAILED DESCRIPTION OF THE INVENTION

Figure 1:
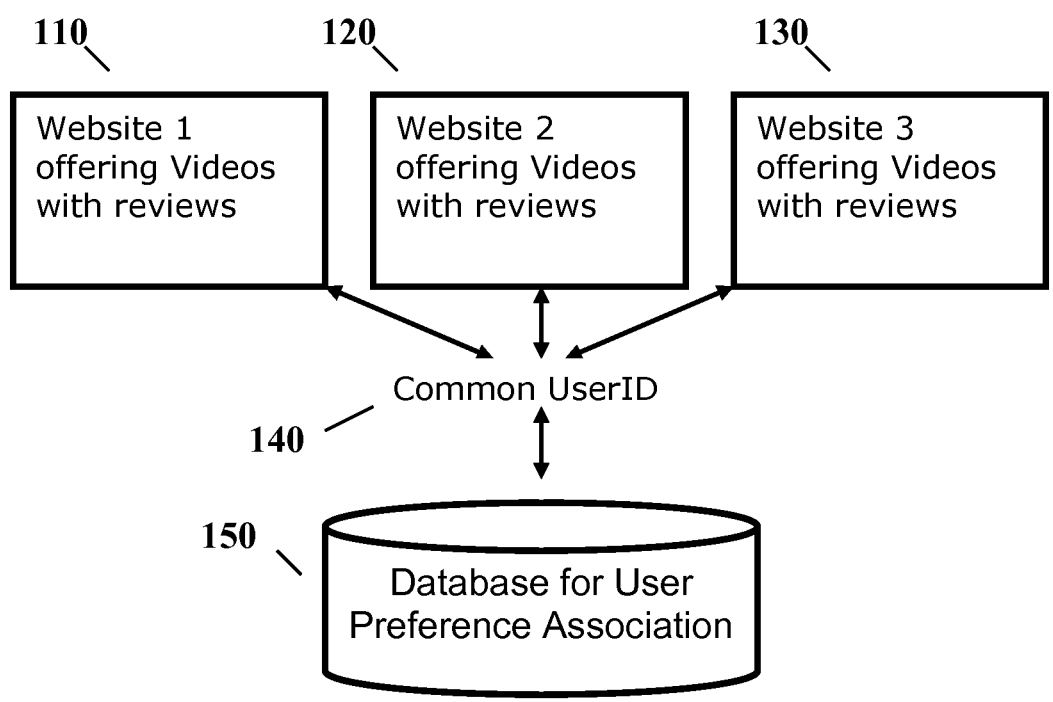
FIG. 1 shows a data flow diagram for the invention indicating that reviews may be gathered from websites offering similar products or services, where some reviews are published under a common userID.

A database of user preference information is extracted and compiled from multiple websites by web crawling robots according to the invention without cooperation from users, or specific participation by any user. Website users who interact with a website are frequently required to register with that site and create a login or userID name that uniquely identifies them. Thereafter, when an individual rates an item, it is often recorded and published under their userID name such that other users can see how a specific individual rated the item. Although there is no requirement that a specific user register on different websites utilizing the identical userID, it is extremely common that this practice occurs. Once the database exists, users can request or be passively offered suggestions that result from preference associations across multiple websites as performed by a preference analysis and suggestion function. The passive offering of suggestions may include without limitation making a phrase or image into a hyperlink; or alternately showing a pop-up image, text box, or dialog box that offers suggestions when the user's cursor passes over the item in question.

The instant invention takes advantage of the frequent use of a unique userID by a particular user. Also, the more unique the userID, the more likely that the userID belongs to the same person when that userID is found registered on multiple websites. A userID such as "john21" may have multiple users, however a more complicated and unusual userID such as "quattro711" or "robogal321" is most probably unique.

Specific userIDs that are utilized by more than one individual may be separated according to preference commonalities and lack thereof. For instance if the preferences on a first set of websites for a specific first userID match consistently with a first group of other users registered on the first set of websites and having similar preferences, and then on a particular second set of websites the preferences published for the same first userID are quite different from those of those same first group of other users who are coincidentally registered on the second set of websites, then it can be statistically assumed that the actual user who registered on the second set of websites using the first userID is a different person from the user who registered the first userID on the first set of websites. Once this identification has been performed, the preference associations can be separated to still extract value from preferences associated with the first userID in spite of its use by multiple persons.

One example of the process for creating the overall database and preference analysis functionality according to the instant invention is described as the following multi-stage process:

Stage 1

Build a database of online media and user preferences, so that if someone really likes a particular video, a software program can find in the database others that really liked it, and then learn what else they like. This database is built by web robots that "crawl" multiple websites where user preferences are published and are associated with specific userIDs, all without any user participation required. Crawling is well know in the art and involves the process where software programs called robots access pages on websites looking for information, and then download and save information in a database when the information fits a criteria that suits the purpose of the particular robot.

Stage 2

A software widget—a software program that for some embodiments of the instant invention may be installed as a plugin for a browser on the user's computer—is made available for one exemplary embodiment of the instant invention so that when someone using a browser selects or "right clicks" on a particular item, they are presented with a menu wherefrom they can choose a function such as "people who liked this also liked . . . ". Again, the user has not supplied their userIDs or passwords. They may or may not have registered to get the required program or widget, and if they registered, the registration function may or may not have acquired their email address. The widget, plugin, or other program that allows a user to access preference-related suggestions according to the instant invention may also have been supplied as part of another program, plugin, or widget they may have installed. Alternately, it may have come pre-installed on their computer or may be implemented by a dynamically loaded function such as for example one running in Java code that becomes active as a result of a user browsing a particular webpage. The screen where the user is presented with a message such as "people who liked this also liked . . ." can have advertising on it, and that advertising is a possible way of monetizing the functionality of the instant invention. Another method for monetizing the instant invention would include a "pay-per-click-through" relationship with websites offering items suggested to the user by the preference analysis and suggestion functionality according to the instant invention. Functionality can be added to the instant invention to enable a user to sign up and provide access to their favorites on different content sites, however this is not required for the successful operation of the instant invention. Also, a website that helps users locate products on the Internet similar to www.nextag.com or www.bizrate.com can incorporate a function that includes "people who liked this also liked . . .", and show items to users that are available on a plurality of websites utilizing the methods described herein for the instant invention.

To construct the database for Stage 1, the system of the instant invention can, for instance, start by having web robots access a website such as YouTube.com. YouTube shows "related videos" and "more videos from the same source" and "promoted videos", but doesn't show the user a function such as "people who liked this also liked . . .". "Related videos" are simply topic-related on YouTube.com.

On YouTube, comments and responses for each video show the user IDs and are categorized by Excellent, Very Good, Good, Average, and Poor. So, the software and system implementing the instant invention will implement a web robot or a plurality of robots that access all YouTube pages containing video reviews and analyze the user comments. For instance, if the system is set to acquire the most positive preferences such as the ones marked "Excellent", then the robot would retrieve only the comments indicating a user rated a video as "Excellent". Subsequently, the robot records the userIDs of each person who is listed along with the link for the video. The software system implementing the instant invention can be programmed to record user preferences that are of any or all degrees of a positive or negative nature.

When the process described above has been completed for all videos offered on a media site such as YouTube, there now exists a database on which a software program can perform the associative analysis needed to create the function of "people who liked this video also liked . . .". Since people often use the same userID across many content sites, another robot can then scour other sites and see what they liked elsewhere. To weed out instances where two people used the same ID, a comparison of topics for the associated videos can be performed. Where the preferences associated with a particular user ID on a particular site are very inconsistent with what that user has chosen on other sites, as determined by preference similarities shared with other users, it may be considered that a different user is using the same userID.

FIG. 1 shows a diagram where websites 110, 120, and 130 are offering videos including reviews of these videos where the reviews are annotated with a userID for each review. A web robot or robots according to this invention crawl these websites and records preference information and corresponding userIDs in database 150. Preference association software according to the instant invention associates reviews across the multiple websites shown according to userIDs while paying particular attention to instances where a common userID or login name 140 has been utilized on different websites. The initial assumption here is that a specific userID used on multiple websites most probably represents the same person or user.

Figure 2:
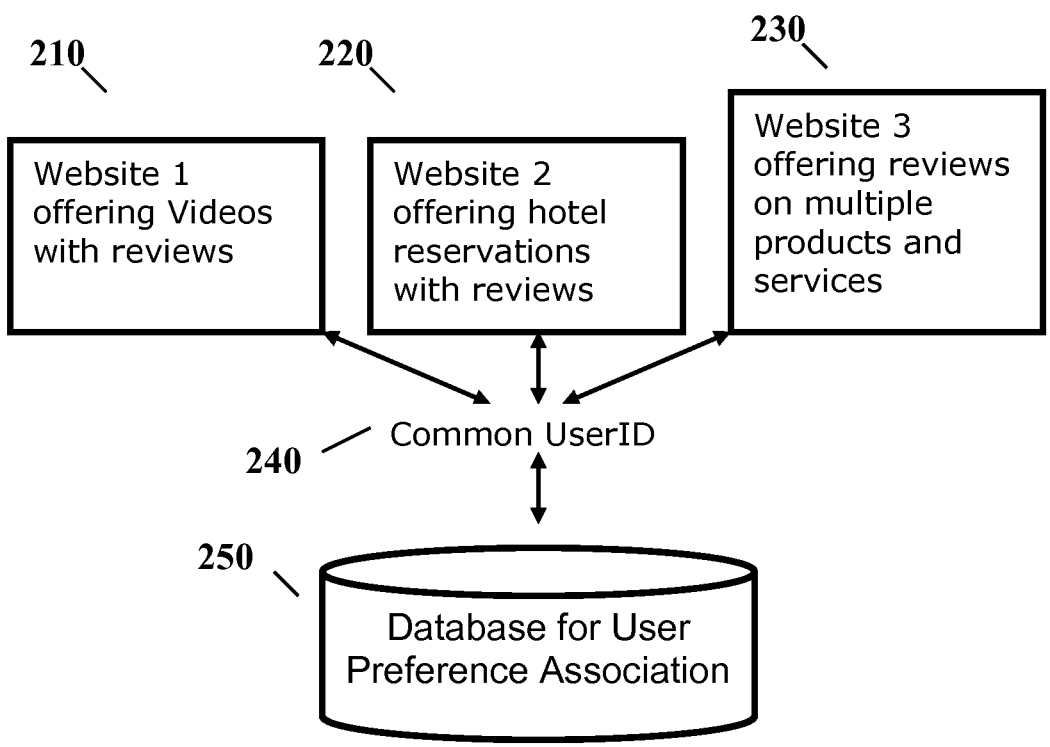
FIG. 2 shows a data flow diagram for the invention indicating that reviews may be gathered from multiple websites offering different products and services, where some reviews are published under a common userID.

The diagram of FIG. 2 shows how a common userID 240 can be recognized on a plurality of websites offering unrelated items. For instance, website 210 offers videos while website 220 offers hotel reservations. Website 230 may be a website offering multiple products and services depending upon what a user searches for within website 230. Again, information extracted by one or more web robots is used to compile database 250 which is used for user preference association and analysis software. For instance, as a result of the architecture and functionality shown in FIG. 2, a user might request that they be shown hotels in a particular city that were preferred by people who liked the kinds of videos they like.

Figure 3:
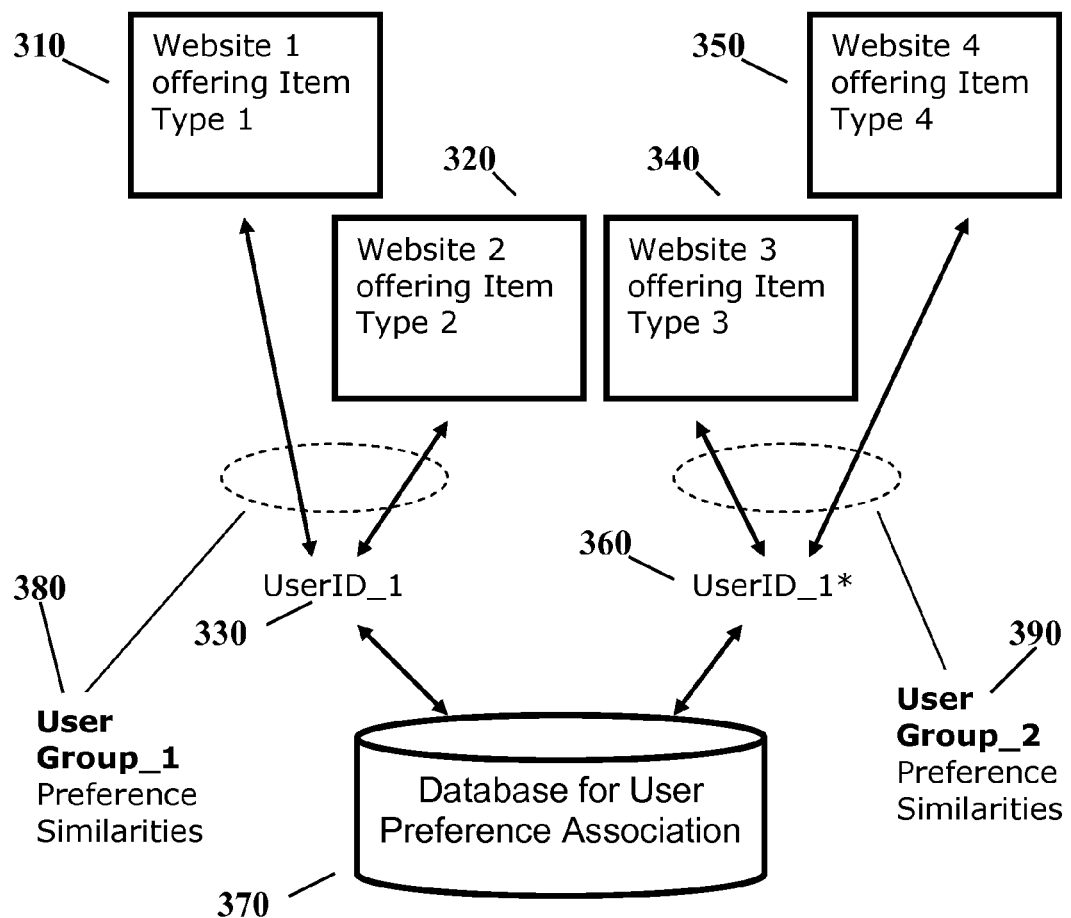
FIG. 3 shows a data flow diagram for the invention where reviews may be gathered from different websites based on a particular userID, but where that particular user ID is utilized by two different users. Also shown are two groups of other users, where each of the two groups of other users exhibits preference similarities to one of the two different users.

Although it is extremely common for a user to use an identical login name on many different websites, and for a login name to be unique to a particular user, as mentioned earlier a particular login name may be utilized by multiple users. For instance, a userID such as "john21" may have multiple users, however a more complicated and unusual userID such as "quattro711" or "robogal321" is most probably unique. Therefore, the present invention provides a mechanism for determining when a particular login or userID is not unique, and subsequently treats the userID as multiple userIDs according to preference associations. FIG. 3 shows how information is analyzed and organized in order to implement this capability. Websites 310 and 320 offers reviews for items by a user having userID_1 330. A first user using userID_1 on websites 310 and 320 has preference similarities to a group of other users that may be called User Group_1 380. The same userID, labeled userID_1* 360 in FIG. 3, is also utilized by a different person than the person using that userID_1 on websites 310 and 320. This second user has used userID_1* on websites 340 and 350 and has preference similarities that match with a different group of users, here labeled User Group_2 390. Preference analysis and Association software operating on database 370 determines that the preferences for users in User Group_1 are different from those of users in User Group_2. As a result of this analysis, software according to the instant invention determines that the first user of user ID_1 is a different person than the second user of userID_1 and henceforth treat them as different users with respect to the websites 310, 320, 330, and 340.

Figure 4:
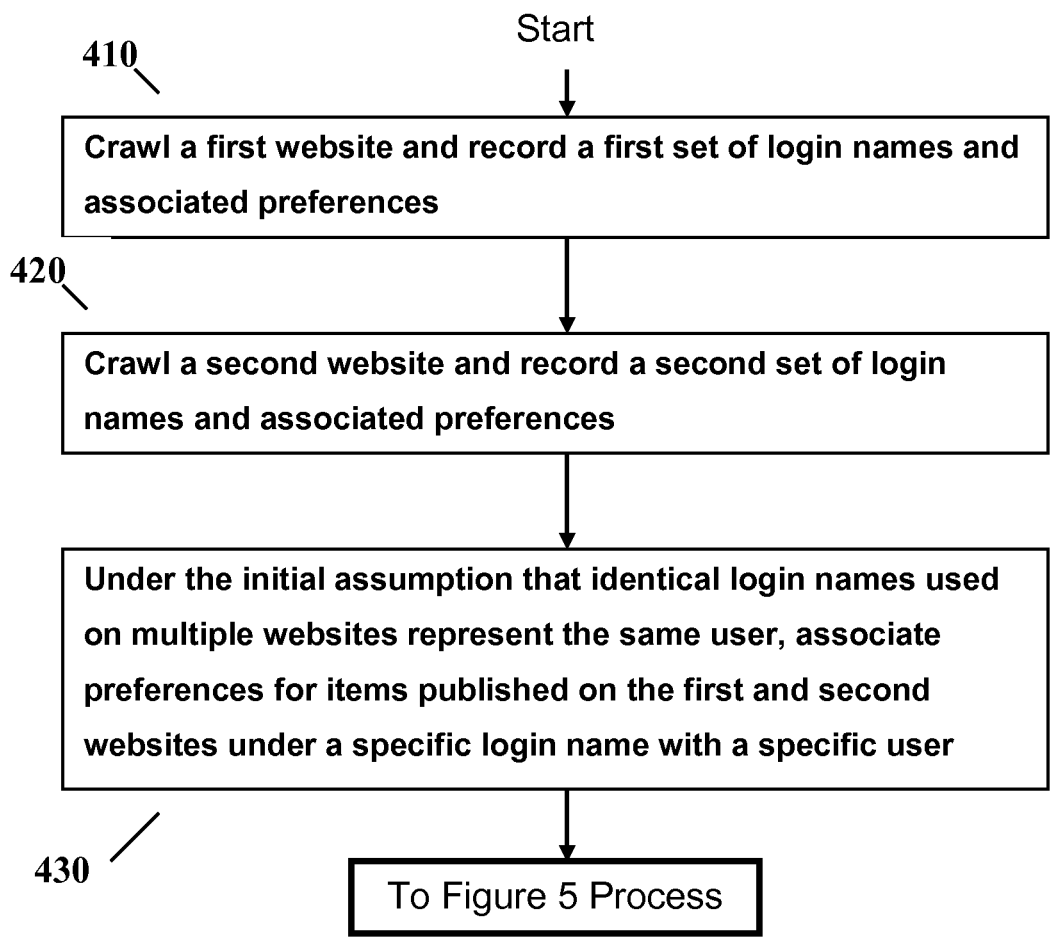
FIG. 4 is a flowchart describing a process for crawling multiple websites to record login names and associated preferences, and subsequently under an initial assumption that identical login names represent the same user, associating preferences on multiple websites with a specific user.

FIG. 4 shows a process for building a preference database across multiple websites under the initial assumption that identical login names used on multiple websites represent the same user. In step 410, a web robot crawls a first website and records a first set of login names and associated preferences for items shown on the first website. In step 420, a web robot crawls a second website and records a second set of login names and associated preferences. In step 430, a software function according to the instant invention performs preference analysis including examining preference data and login names that were extracted from the first and second website, and associating items for which reviews were published under a specific login name with that same login name across multiple websites. The process may be repeated with additional websites to build a preference database encompassing a wide range of websites and item types.

Figure 5:
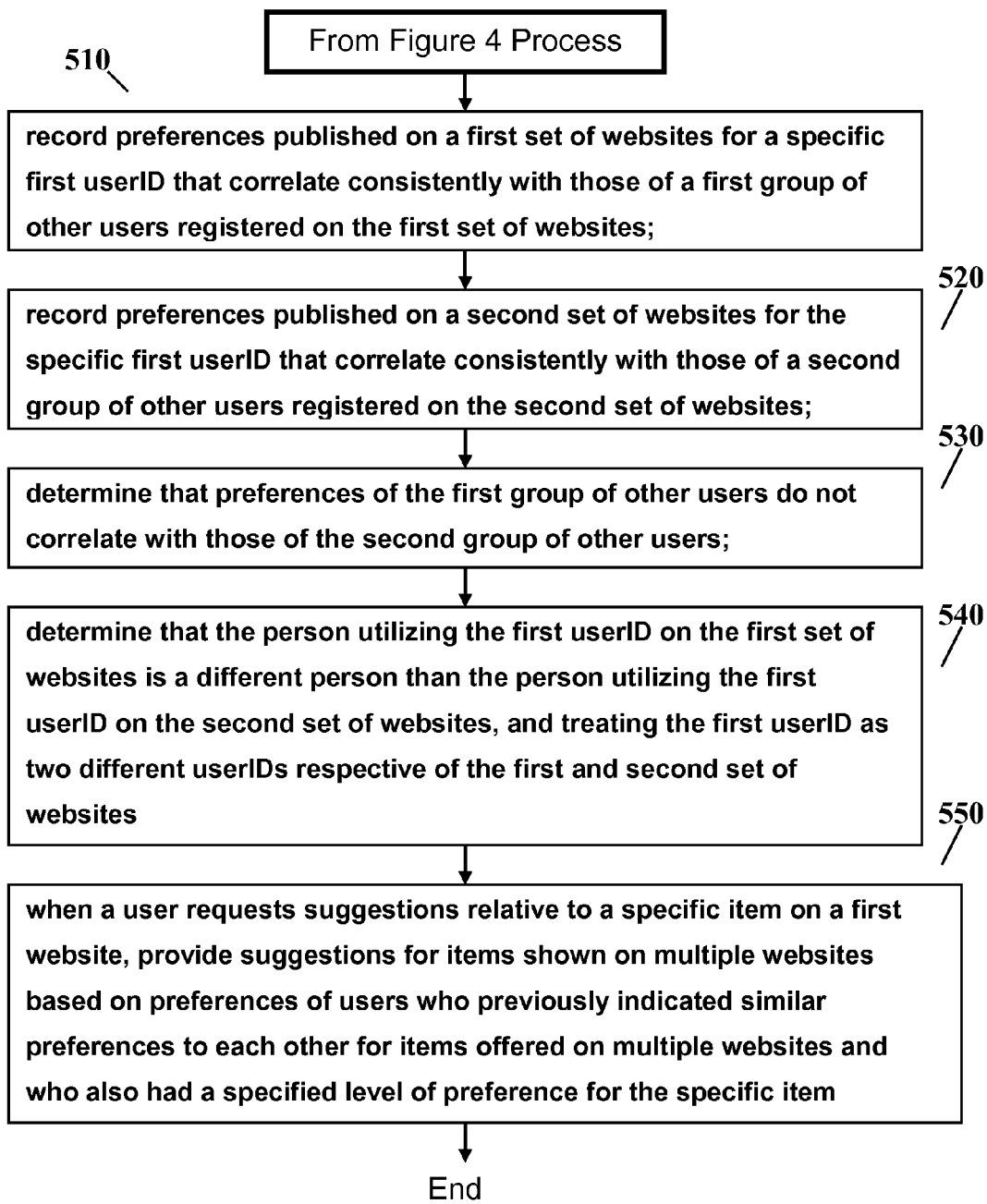
FIG. 5 shows a flowchart that continues the process of FIG. 4, and discloses a method for determining that a particular userID is being utilized by multiple persons and thereafter distinguishing between preferences of different persons using the particular userID.

The process shown in FIG. 5 optionally continues where the process of FIG. 4 left off, and resolves the issue of a specific user ID or login name being used by multiple users. In step 510 preferences on a first set of websites for the userID are recorded as correlating with preferences of a first group of other users who have also published reviews on the first set of websites. In step 520 preferences are recorded for a second set of websites where the same specific userID has been used, preferences on the second set of websites correlating with a second group of users who have published reviews on the second set of websites. In step 530, analysis software determines that the preferences of the first group of users do not correlate with those of the second group of users, and therefore in step 540 the system according to the instant invention has determined that the person utilizing the userID on the first set of websites is a different person than the person using the same userID on the second set of websites. According to this process and per step 550, when a user thereafter requests suggestions relative to a specific item on a website, the system provides suggestions for items shown on multiple websites based on users who previously indicated similar preferences to each other and also had a specified level of preference for the specific item. According to the process of FIG. 5, two or more users who utilized the same userID on different websites will be properly treated as different persons.

When items are recommended or suggested to a user, it is customary to base the recommendation mostly or exclusively on positive preferences. The capability sometimes offered to users as "people who liked this also like..." typically focuses on a similarity of likes. It turns out, however that negative preferences also play a role in comparing the tastes of different users. The most accurate recommendations may, in fact, take into account both positive and negative preferences. There is also an issue that relates to the relative weighting of a negative preference relative to a positive one. There is an old saying in business that one mistake can erase ten "atta-boys". Given that there may be some truth to this, it may be appropriate in some instances to weight negative preferences more than positive preferences, or at least provide a profile for applying negative preferences such that they may be weighted in such a way as to provide the most useful suggestions to a user, a class of user, or a user viewing a class of items. Such a preference profile may include an uneven weighting of negative preferences versus positive preferences, and may also include an uneven weighting of emphasis with regard to different levels of negative and positive preference ratings. The optimal preference profile is determined over time by altering the weighting profile and subsequently observing user behavior, followed by determining their propensity to respond to a suggestion resulting from a particular weighting profile.

Accordingly, table 600 of FIG. 6 shows an example of a weighted preference profile for nine exemplary items 606 where a positive weighting 602 of 0.75 has been applied to the average positive ratings 608 to produce a weighted average positive rating 610 for each item. Also a negative weighting 604 of 0.25 has been applied to the average negative ratings 612 to produce a weighted average negative rating 614 for each item. Combining the weighted average positive ratings with the weighted average negative ratings for each item produces a net preference score 616 resulting in a weighted ranking for the nine exemplary items as shown in column 620. The average net preference score for these nine items 618 is also shown. With the positive and negative weighting factors 602 and 604 respectively as shown in FIG. 6, item 3 having the highest weighted net preference score would be the best of the exemplary nine items to suggest to a specific user, should this weighting profile be shown to correlate with the preferences of the specific user.

Figure 14:
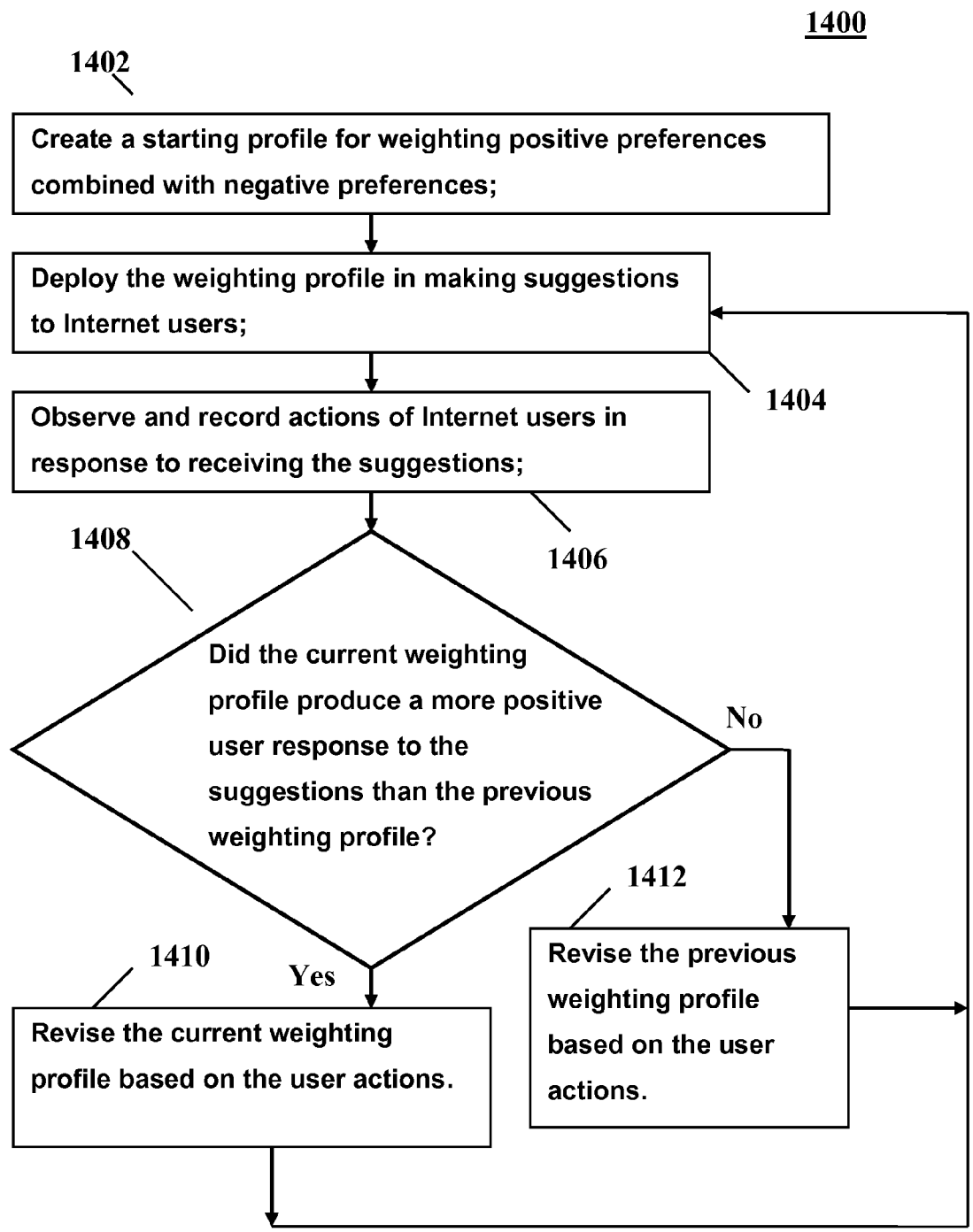
FIG. 14 shows a flow chart for an exemplary process for optimizing weighting profiles for positive and negative preferences by evaluating user responses to suggestions based on net preferences resulting from combining the positive and negative preferences according to the weighting profiles.

Other preference weighting profiles are possible. Also, as shown in FIG. 14 an optimum profile for a given user can be determined over time by an exemplary process of iteration as shown.

Figure 7:
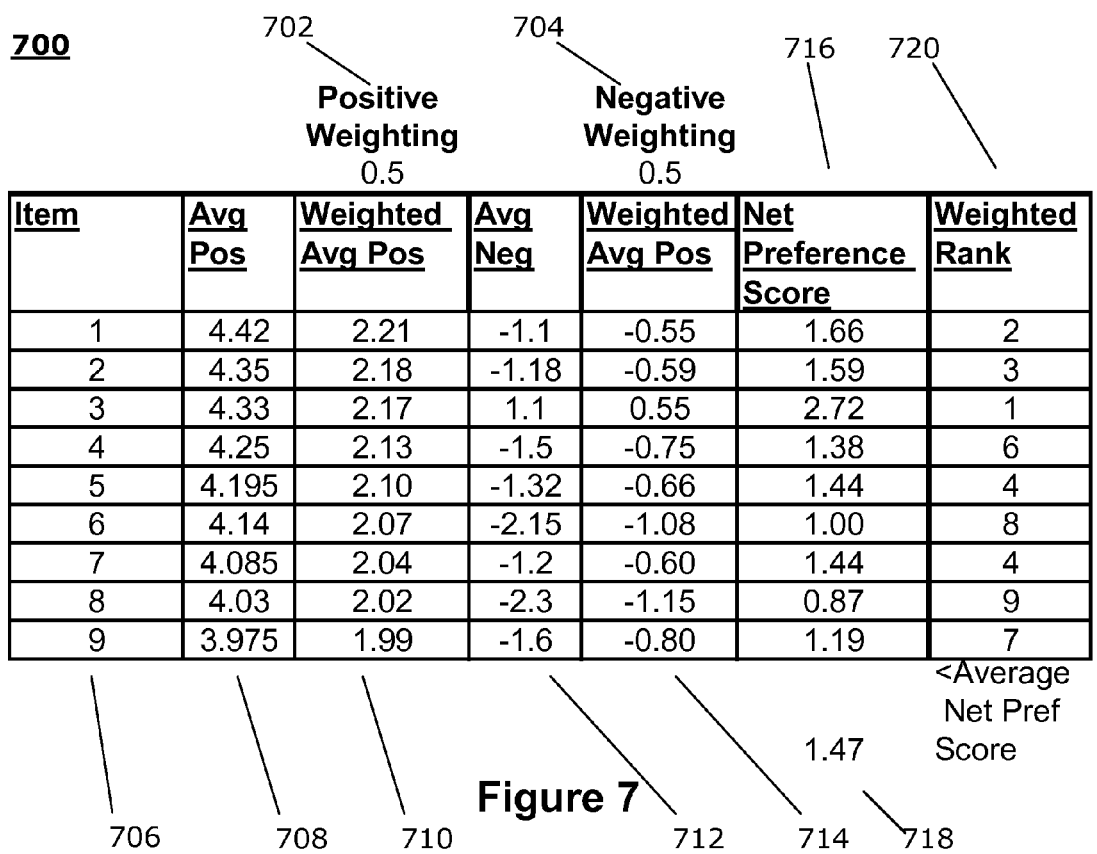
FIG. 7 shows a table demonstrating will how positive preference ratings may be weighted equally relative to negative ratings in order to produce a net preference score.

Table 700 of FIG. 7 shows an alternative example of a weighted preference profile for nine exemplary items 706 where a positive weighting 702 of 0.5 has been applied to the average positive ratings 708 to produce a weighted average positive rating 710 for each item. Also a negative weighting 704 of 0.5 has been applied to the average negative ratings 712 to produce a weighted average negative rating 714 for each item. Combining the weighted average positive ratings with the weighted average negative ratings for each item produces a net preference score 716 resulting in a weighted ranking for the nine exemplary items as shown in column 720. The average net preference score for these nine items 718 is also shown. With the positive and negative weighting factors 702 and 704 respectively as shown in FIG. 7, item 3 having the highest weighted net preference score would be the best of the exemplary nine items to suggest to a specific user, should this weighting profile be shown to correlate with the preferences of the specific user.

Table 800 of FIG. 8 shows an alternative example of a weighted preference profile for nine exemplary items 806 where a positive weighting 802 of 0.9 has been applied to the average positive ratings 808 to produce a weighted average positive rating 810 for each item. Also a negative weighting 804 of 0.1 has been applied to the average negative ratings 812 to produce a weighted average negative rating 814 for each item. Combining the weighted average positive ratings with the weighted average negative ratings for each item produces a net preference score 816 resulting in a weighted ranking for the nine exemplary items as shown in column 820. The average net preference score for these nine items 818 is also shown. With the positive and negative weighting factors 802 and 804 respectively as shown in FIG. 8, item 3 having the highest weighted net preference score would be the best of the exemplary nine items to suggest to a specific user, should this weighting profile be shown to correlate with the preferences of the specific user.

Table 900 of FIG. 9 shows an alternative example of a weighted preference profile for nine exemplary items 906 where a positive weighting 902 of 0.1 has been applied to the average positive ratings 908 to produce a weighted average positive rating 910 for each item. Also a negative weighting 904 of 0.9 has been applied to the average negative ratings 912 to produce a weighted average negative rating 914 for each item. Combining the weighted average positive ratings with the weighted average negative ratings for each item produces a net preference score 916 resulting in a weighted ranking for the nine exemplary items as shown in column 920. The average net preference score for these nine items 918 is also shown. With the positive and negative weighting factors 902 and 904 respectively as shown in FIG. 9, item 3 having the highest weighted net preference score would be the best of the exemplary nine items to suggest to a specific user, should this weighting profile be shown to correlate with the preferences of the specific user.

Note that while items 1, 2, and 3 consistently rank second, third, and first respectively with respect to weighted ranking score 920, the different weighted preference profiles cause the fourth-ranked item to vary between items 5 and 4, and for the weighting profiles of FIGS. 7 and 9, cause items 5 and 7 to be tied for the fourth-ranked position. Other weighting profiles and other exemplary non-weighted preference scores may cause a wider variation in weighted preference rankings than shown in exemplary FIGS. 6-9.

In general, it is preferable to only suggest an item to a user if the weighted preference ranking for that item is above a pre-determined threshold value. Alternately, the positive and negative ratings for items can be dealt with separately, including thresholds that are independently applied to positive and negative ratings. Having a resultant weighted preference rating above a threshold value would then determine that a rating should be included in determining suggestions to be made to a user. For example:

(i) Avg Pos=>Include only the average of positive ratings for ratings above a certain level (the positive threshold value)

(ii) Avg Neg=>Include only the average of negative ratings for ratings below a certain level (the negative threshold value)

As an alternative to the exemplary method for applying preference weightings described with respect to FIGS. 6-9, a weighting curve can be continuously varied such that it has a shape, and that positive and negative weightings can be applied in an uneven, and/or non-linear manner. Such a method is described for example with respect to FIGS. 10-13.

Figure 10:
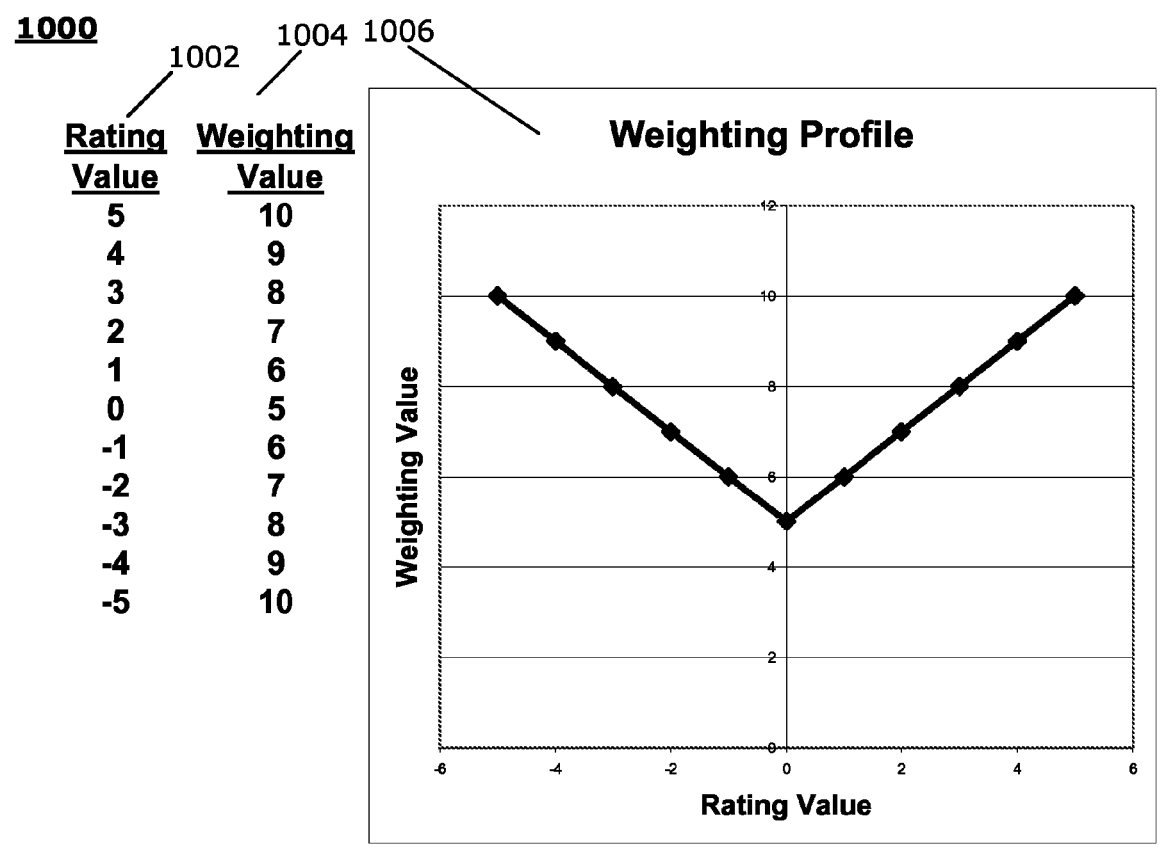
FIG. 10 shows how preference rating values may be weighted according to a variable profile, where different weighting values are applied according to specific rating values. For this figure, the weighting profile for negative ratings mirrors the profile for positive ratings.

As shown in table 1000 of FIG. 10, each rating value 1002 may be provided with a different weighting value 1004. Graph 1006 of FIG. 10 shows how the exemplary weighting values 1004 are applied to rating value 1002 in FIG. 10.

Figure 11:
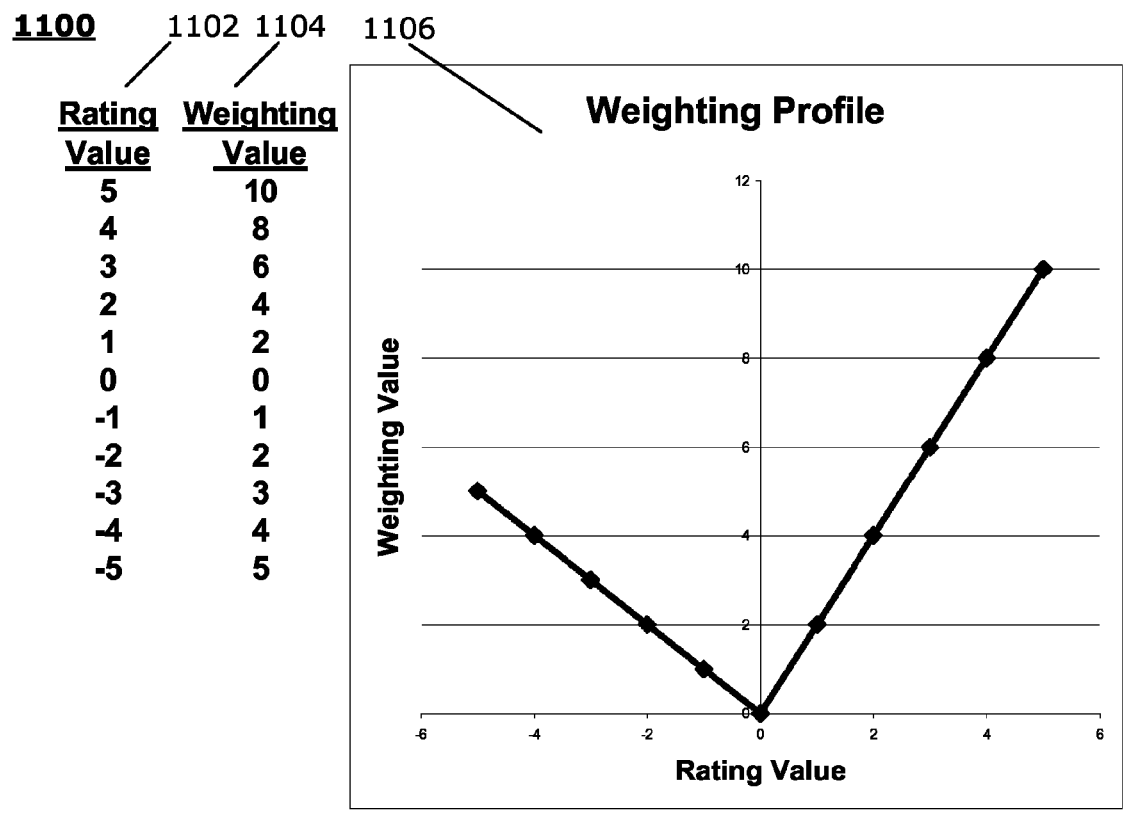
FIG. 11 shows how preference rating values may be weighted according to a variable profile, where different weighting values are applied according to specific rating values. For this figure, the weighting profile for negative ratings is less steep than the weighting profile for positive ratings.

Alternately as shown in table 1100 of FIG. 11, each rating value 1102 may be provided with a different weighting value 1104. Graph 1106 of FIG. 11 shows how the exemplary weighting values 1104 are applied to rating value 1102 in FIG. 11.

Figure 12:
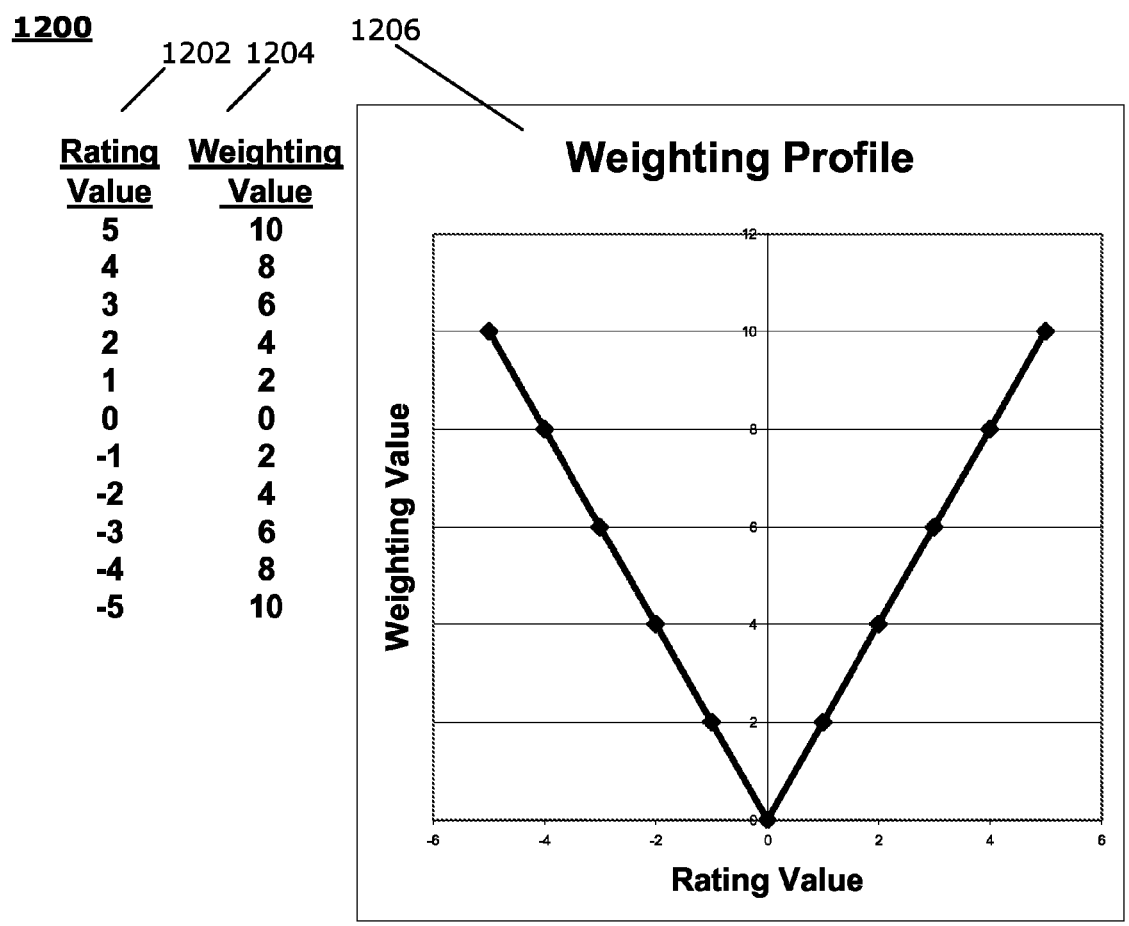
FIG. 12 shows how preference rating values may be weighted according to a variable profile, where different weighting values are applied according to specific rating values. For this figure, the weighting profile for negative ratings mirrors the profile for positive ratings, and both profiles are steeper than those shown in FIG. 10.

Alternately as shown in table 1200 of FIG. 12, each rating value 1202 may be provided with a different weighting value 1204. Graph 1206 of FIG. 12 shows how the exemplary weighting values 1204 are applied to rating value 1202 in FIG. 12.

Figure 13:
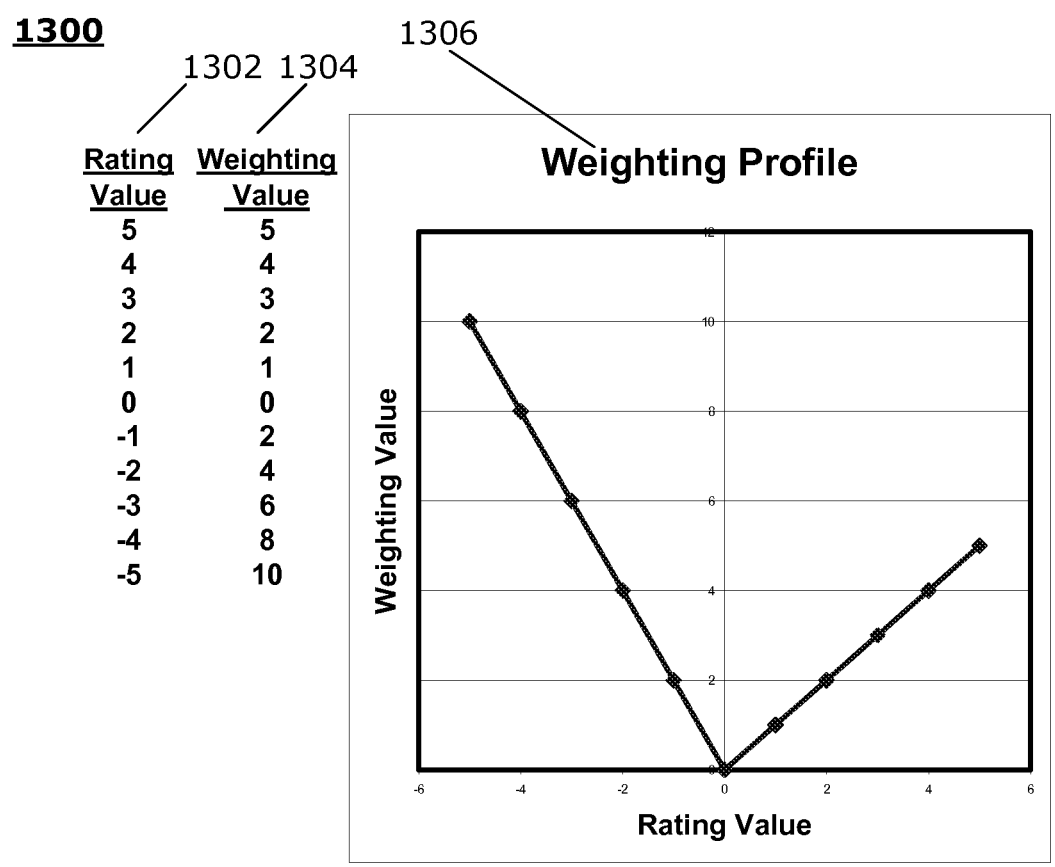
FIG. 13 shows how preference rating values may be weighted according to a variable profile, where different weighting values are applied according to specific rating values. For this figure, the weighting profile for negative ratings is steeper than the weighting profile for positive ratings.

Alternately as shown in table 1300 of FIG. 13, each rating value 1302 may be provided with a different weighting value 1304. Graph 1306 of FIG. 13 shows how the exemplary weighting values 1304 are applied to rating value 1302 in FIG. 13.

Preference weighting profiles according to exemplary embodiments of the invention may be optimized over time with respect to:

(i) classes of items
(ii) classes of users
(iii) individual users

An exemplary and non-limiting method for optimizing preferences with respect to suggestions shown to an individual user is shown in flowchart 1400 of in FIG. 14. In step 1402, a starting profile is created for weighting positive and negative preferences, either individually or combined. In step 1404, the weighting profile is deployed in determining suggestions to be offered to Internet users. In step 1406, the actions of Internet users when offered the suggestions are observed and recorded. Then, in step 1408 a determination is made whether the currently deployed weighting profile produced a more positive user response than a previously deployed weighting profile, if in fact a different weighting profile had been previously deployed. A more positive user response to a suggestion can include without limitation:

(i) clicking on a suggested item to view it;
(i) buying a suggested item;
(iii) sharing a link to a suggested item;

If the current weighting profile produced a more positive response, then the current weighting profile is revised 1410 to create a new possibility for the weighting profile in hopes that it might improve user responses even more. If the current weighting profile did not produce a more positive response, then the previous weighting profile is revised 1412 to create a new possibility for the weighting profile in hopes that it might improve user responses even more. As such, the process of FIG. 14 continually revises and improves the effectiveness of the preference weighting profile.

* * *

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system for assisting users with the selection of items on the Internet, comprising:

one or more hardware processors;

at least one web robot operable on the one or more hardware processors for crawling multiple websites to determine published userIDs and associated published preferences for items that are available on the web;

a database accessible to the one or more hardware processors for storing the userIDs and associated preferences;

software operable on the one or more hardware processors for performing an analysis and suggestion function;

wherein the system assumes until determined otherwise that a userID used by a first user on a first website represents the same user as the same userID used by a second user on a second website;

wherein associated preferences stored for a particular userID include preferences for items available from a plurality of websites;

wherein the system provides a third user with a suggested first item based on the expressed preferences of at least the first and second users across multiple websites relative to the first item and items that at least the first and second users have previously reviewed;

wherein the suggested first item provided to the third user is based on both positive and negative preferences of the first and second users;

wherein a weighting profile is created for weighting rating values that represent positive and negative preferences; and wherein the weighting profile is deployed by the system with respect to combining preferences of the first and second users in suggesting the first item.

2. The system of claim 1 wherein the preferences of the first and second users comprise a plurality of distinct rating values, and wherein the weighting profile is uneven such that a weighting value applied to a positive rating is different from a weighting value applied to a negative rating.

3. The system of claim 1 wherein the preferences of the first and second users comprise a plurality of distinct rating values, and wherein each distinct rating value is assigned a weight according to the weighting profile.

4. The system of claim 1, wherein when the third user requests suggestions relative to a specific product or service category, providing suggestions for items shown on multiple websites based on preferences of users who had similar preferences to each other for items offered on multiple websites and who also had a specified level of preference for said specific product or service category; and
    wherein the third user need provide no preference information beyond requesting suggestions relative to the specific product or service category in order to receive the suggestions.

5. The system of claim 4 further including a widget or plugin operating on a user's computer that responds to a selection action of a user respective of a particular item and whereby the selection action causes the user to receive said suggestions for items shown on multiple websites.

6. The system of claim 1, wherein to determine that the userID used by the first user to express preferences on the first website represents a different user than the same userID used by the second user to express preferences on the second website, the system examines preference commonalities and lack thereof between preferences expressed for the first and second users on the first and second websites.

7. The system of claim 6, wherein after thus determining a lack of preference commonality between preferences expressed by the first and second users, the userID on the first website and the same userID on the second website are thereafter treated as two different userIDs respective of the first and second websites.

8. A computerized method for enabling users to receive suggestions relative to items shown on one or more websites based on preference associations across multiple websites, wherein one or more processors perform the method comprising:
    crawling a first website and recording in a database a first set of published login names and associated published preferences relative to items reviewed by persons using said first set of published login names;
    crawling a second website and recording in said database a second set of published login names and associated published preferences relative to items reviewed by persons using said second set of published login names;
    under the initial assumption that identical login names used on multiple websites represent the same user, associating preferences for items published on the multiple websites under a specific login name with a specific user; and
    wherein to determine that a first instance of a specific login name used to express preferences on a first website represents a different user than a second instance of the specific login name used to express preferences on a second website, and to appropriately handle reviews related to the specific login name thereafter, the method further comprises:
        determining that preferences expressed for the specific login name on the first website are inconsistent with preferences expressed for the specific login name on the second website; and
        thereafter treating as different users, the first instance of the specific login name for utilizing preferences on the first website, and the second instance of the specific login name for utilizing preferences on the second website.

9. The method of claim 8, further comprising:
when any user requests suggestions relative to a specific product or service category, providing suggestions for items shown on multiple websites based on preferences of users who previously indicated similar preferences to each other for items offered on multiple websites and who also had a specified level of preference for said specific product or service category; and
    wherein said user need provide no preference information beyond requesting suggestions relative to the specific product or service category in order to receive the suggestions.

10. The method of claim 8, further comprising:
when any user requests suggestions relative to a specific item on a first website, providing suggestions for items shown on multiple websites based on preferences of other users who previously indicated similar preferences to each other for items offered on multiple websites and who also had a specified level of preference for said specific item; and
    wherein said user need provide no preference information beyond requesting suggestions relative to the specific item in order to receive the suggestions.

11. The method of claim 8, further comprising:
when any user requests suggestions for a specific product or service category from a first website, providing suggestions for items available on said first website based on preferences of users who had similar preferences to the first user for items offered on at least a second website; and
    wherein said user need provide no preference information beyond requesting suggestions relative to the specific product or service category in order to receive the suggestions.

12. The method of claim 8, further comprising:
thereafter treating the specific login name on the first website and the same specific login name on the second website as two different login names respective of the first and second websites.

13. The method of claim 8 wherein the suggestions relative to items shown on one or more websites based on preference associations across multiple websites are based on both positive and negative preferences published on the multiple websites; and
    wherein the positive and negative preferences are combined according to a weighting profile for rating distinct rating values supplied by the persons using the first and second sets of published login names.

14. The method of claim 13 wherein the weighting profile is uneven.

15. A computerized method for providing users with suggestions relative to items shown on one or more websites based on preference correlations across multiple websites, wherein one or more processors perform the method comprising:
    when a first user visits a first website and shows interest in a first item, recommending to the first user a second item available on at least a second website, based on published reviews available on at least the second website and a third website;
    wherein the first item previously was reviewed by a second user on the second website and a third user on the third website;
    wherein the first item was also previously reviewed by a fourth user and published on both the second and third websites under a first userID;
    wherein the first item received positive reviews from at least the second, third, and fourth users;
    wherein the reviews from the second, third, and fourth users were retrieved by a Web crawler and wherein the reviews from the second, third, and fourth users were stored in a database based on each user's published userID; and wherein in general, published reviews from the second, third, and fourth users correlate with each other.

16. The method of claim 15 wherein to be shown the first item available on the second website, the first user need not be identified by the first website and need only show an interest in a product or service, or in a product or service category.

17. The method of claim 15 wherein the fourth user accessing the third website using the first user ID is determined to be a different user than the fourth user accessing the second website using the first user ID by comparing preferences for the fourth user published on the third website with preferences for the fourth user published on the second website with respect to preference commonalities and lack thereof.

18. The method of claim 17, further comprising:
thereafter treating the fourth user accessing the third website and the fourth user accessing the second website as two different userIDs respective of the third and second websites.

19. The method of claim 15 wherein the suggestions relative to items shown on one or more websites based on preference associations across multiple websites are based on both positive and negative preferences published on the multiple websites; and wherein the positive and negative preferences are combined according to a weighting profile for rating distinct rating values supplied by reviewers who published preferences on the multiple websites.

20. The method of claim 19 wherein the weighting profile is uneven.

21. A computerized method for providing users with suggestions relative to items shown on one or more websites based on expressed user preferences, wherein one or more processors perform the method comprising:

establishing a database of user preferences, including reviews for items that contain both positive and negative preferences ;

creating a first weighting profile that specifies how positive and negative preferences for a specific item are combined into a single rating for the specific item;

deploying the first weighting profile in suggesting items to users for items available on the web;

observing and recording actions of users in response to receiving suggestions for items based on the first weighting profile;

revising the first weighting profile to create a second weighting profile and deploying the second weighting profile;

observing and recording actions of users in response to receiving suggestions for items based on the second weighting profile;

if the observed user actions in response to receiving suggestions for items based on the second weighting profile represent a more positive user response than user actions in response to receiving suggestions for items based on the first weighting profile, then utilizing the second weighting profile for providing suggestions to users; and if the observed user actions in response to receiving suggestions for items based on the second weighting profile do not represent a more positive user response than user actions in response to receiving suggestions for items based on the first weighting profile, then continuing to utilize the first weighting profile for providing suggestions to users.

22. The computerized method of claim 21 wherein user actions representing a more positive user response comprise at least one of:
clicking on a suggested item to view it;
sharing a link to a suggested item; and
purchasing a suggested item.

23. The computerized method of claim 21 wherein according to the weighting profile, positive preferences are weighted differently from negative preferences.

24. The computerized method of claim 21 wherein each review comprises a choice of a rating value on a rating scale comprising discrete rating values; and wherein according to the weighting profile, at least two discrete rating values are weighted differently from each other among positive ratings, and at least two discrete rating values are weighted differently from each other among negative ratings.

25. The computerized method of claim 21 wherein suggesting an item to a user comprises showing the user an advertisement related to the suggested item.

* * * * *